United States Patent
Hyde et al.

(10) Patent No.: US 8,475,868 B2
(45) Date of Patent: Jul. 2, 2013

(54) FOAM-LIKE STRUCTURES BASED ON REACTIVE COMPOSITE MATERIALS

(75) Inventors: Roderick A. Hyde, Redmond, WA (US); Muriel Y. Ishikawa, Livermore, CA (US); Edward K. Y. Jung, Bellevue, WA (US); Jordin T. Kare, Seattle, WA (US); Alois A. Langer, Pasadena, MD (US); Eric C. Leuthardt, St. Louis, MO (US); Nathan P. Myhrvold, Medina, WA (US); Thomas J. Nugent, Jr., Issaquah, WA (US); Clarence T. Tegreene, Bellevue, WA (US); Charles Whitmer, North Bend, WA (US); Lowell L. Wood, Jr., Bellevue, WA (US); Richard N. Zare, Stanford, CA (US)

(73) Assignee: The Invention Science Fund I LLC

( * ) Notice: Subject to any disclaimer, the term of this patent is extended or adjusted under 35 U.S.C. 154(b) by 1149 days.

(21) Appl. No.: 12/291,840

(22) Filed: Nov. 12, 2008

(65) Prior Publication Data
US 2010/0104848 A1 Apr. 29, 2010

Related U.S. Application Data

(63) Continuation-in-part of application No. 12/290,016, filed on Oct. 23, 2008.

(51) Int. Cl.
*B05D 5/06* (2006.01)

(52) U.S. Cl.
USPC ............ 427/162; 264/1.1; 427/243; 427/244; 427/245; 427/246; 427/247; 427/457

(58) Field of Classification Search
USPC .................... 427/162, 457, 243–247; 264/1.1
See application file for complete search history.

(56) References Cited

U.S. PATENT DOCUMENTS

| | | | |
|---|---|---|---|
| 3,660,182 A | 5/1972 | Cook et al. | |
| 3,816,952 A * | 6/1974 | Niebyski et al. | 75/415 |
| 4,317,769 A | 3/1982 | Saito et al. | |
| 4,909,842 A * | 3/1990 | Dunmead et al. | 75/236 |
| 5,536,947 A | 7/1996 | Klersy et al. | |
| 5,547,715 A | 8/1996 | Barbee, Jr. et al. | |
| 6,055,180 A | 4/2000 | Gudesen et al. | |
| 6,991,855 B2 | 1/2006 | Weihs et al. | |
| 7,020,006 B2 | 3/2006 | Chevallier et al. | |
| 7,186,998 B2 | 3/2007 | Ovshinsky et al. | |
| 7,358,823 B2 | 4/2008 | Abadeer et al. | |
| 7,459,933 B2 | 12/2008 | Mouttet | |

(Continued)

FOREIGN PATENT DOCUMENTS

GB 893260 A 4/1962

OTHER PUBLICATIONS

Combined Search and Examination Report dated Feb. 24, 2010; International App. No. GB0918676.8; pp. 1-6.

(Continued)

*Primary Examiner* — Timothy Meeks
*Assistant Examiner* — Elizabeth Burkhart

(57) ABSTRACT

Articles having porous or foam-like elements are provided. The design, fabrication and structures of the articles exploit properties of reactive composite materials (RCM) and their reaction products. In particular, fluids generated by reacting RCM are utilized to create or fill voids in the porous or foam-like elements.

37 Claims, 3 Drawing Sheets

U.S. PATENT DOCUMENTS

| | | | |
|---|---|---|---|
| 7,644,854 B1 * | 1/2010 | Holmes et al. | 228/234.3 |
| 7,763,552 B2 | 7/2010 | Tong et al. | |
| 7,855,435 B2 | 12/2010 | Klostermann et al. | |
| 7,910,904 B2 | 3/2011 | Kuo et al. | |
| 7,929,335 B2 | 4/2011 | Gopalakrishnan | |
| 7,969,770 B2 | 6/2011 | Chen et al. | |
| 7,994,034 B2 | 8/2011 | Fournier et al. | |
| 2003/0164289 A1 | 9/2003 | Weihs et al. | |
| 2003/0232179 A1 | 12/2003 | Steenblik et al. | |
| 2004/0213986 A1 * | 10/2004 | Kim et al. | 428/315.7 |
| 2007/0183919 A1 * | 8/2007 | Ayer et al. | 419/2 |
| 2010/0086750 A1 | 4/2010 | Blumberg et al. | |

OTHER PUBLICATIONS

UK Intellectual Property Office Examination Report Under Section 18(3); App. No. GB0918676.8; Aug. 5, 2011; pp. 1-3.

Southwire Product Catalog; printed on Nov. 30, 2011; pp. 1-2; Southwire Company; http://www.southwire.com/products/ProductCatalog.htm.

"Installing A 3-Way Switch With Wiring Diagrams"; bearing a date of 2004 and printed on Nov. 29, 2011; pp. 1-5; The Home Improvement Web Directory; http://www.homeimprovementweb.com/information/how-to/three-way-switch.htm.

* cited by examiner

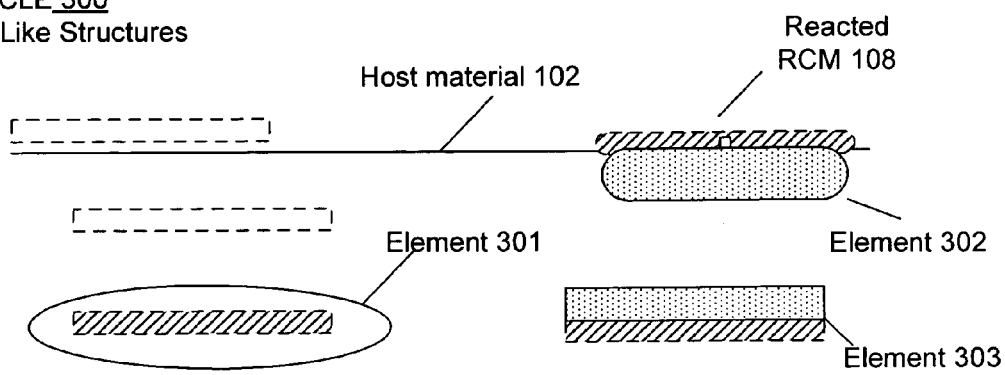
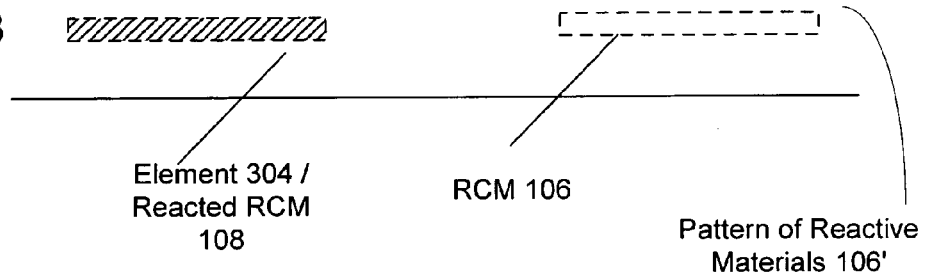
FIG. 3
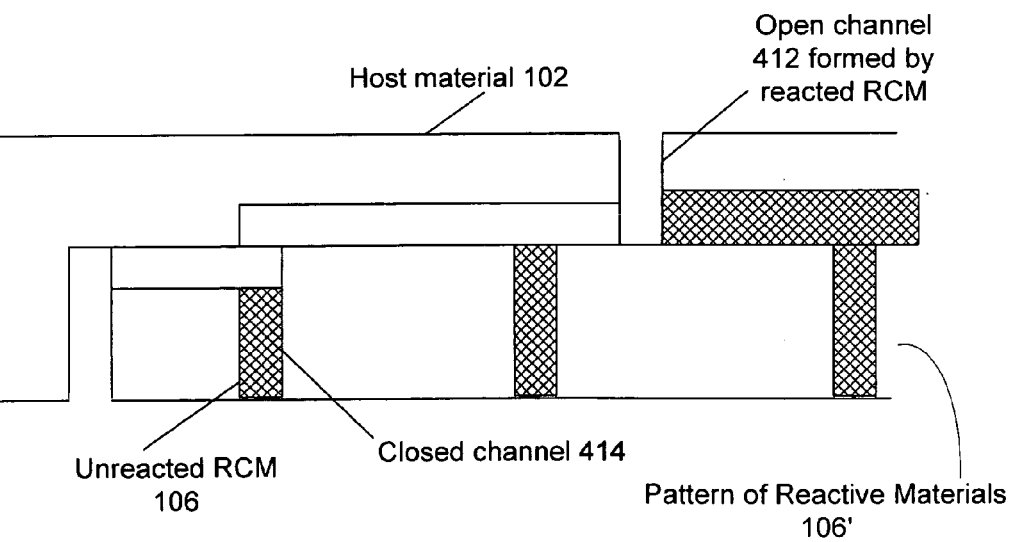
FIG. 4 ARTICLE 400 With Customized Microplumbing

FIG. 5

METHOD 500

510
Generate fluids by reacting reactive composite materials (RCM) disposed in a selected pattern in a host material.

520
Form fluid-filled voids in the host material.

FIG. 6

METHOD 600

610
Provide RCM in or proximate to a region, wherein the RCM are configured to generate fluids upon reaction.

620
Generate fluids by selectively reacting a portion of the RCM in or proximate to the region.

630
Form a selected arrangement of voids that are filled with the generated fluids in or proximate to the region.

FOAM-LIKE STRUCTURES BASED ON REACTIVE COMPOSITE MATERIALS

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

1. For purposes of the USPTO extra-statutory requirements, the present application constitutes a continuation-in-part of U.S. patent application Ser. No. 12/290,016, entitled OPTICAL AND METAMATERIAL DEVICES BASED ON REACTIVE COMPOSITE MATERIALS, naming Kenneth G. Caldeira, Peter L. Hagelstein, Roderick A. Hyde, Muriel Y. Ishikawa, Edward K. Y. Jung, Jordin T. Kare, Nathan P. Myhrvold, Thomas J. Nugent, Jr., John Brian Pendry, David Schurig, Clarence T. Tegreene, Charles Whitmer, and Lowell L. Wood, Jr. as inventors, filed on Oct. 23, 2008, which is currently co-pending, or is an application of which a currently co-pending application entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present applicant entity has provided above a specific reference to the application(s) from which priority is being claimed as recited by statute. Applicant entity understands that the statute is unambiguous in its specific reference language and does not require either a serial number or any characterization, such as "continuation" or "continuation-in-part," for claiming priority to U.S. patent applications. Notwithstanding the foregoing, applicant entity understands that the USPTO's computer programs have certain data entry requirements, and hence applicant entity is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated by reference herein to the extent such subject matter is not inconsistent herewith.

BACKGROUND

Reactive composite materials (RCM) may include one or more reactive materials that react upon proper excitation. Exemplary RCM include powdered materials (e.g., powder compacts or mixtures) disposed in binders (e.g., epoxy). Other exemplary RCM include mechanically-shaped combinations of reactive materials (e.g., aluminum and nickel, and titanium and boron carbide).

The RCM may be disposed as layers, islands, or particles in a composite structure. A reaction that is suitably initiated at a starting location or point in the RCM may self-propagate through the RCM disposed in the composite structure changing the structural properties of the latter. For example, Weihs et al. U.S. Patent Application No. 20060068179 A1 describes electrical circuit fuses, which are made of RCM that undergo an exothermic chemical reaction and break-up to interrupt current flow in a circuit. Further, for example, Makowiecki et al. U.S. Pat. No. 5,381,944 Barbee et al. U.S. Pat. No. 5,538,795, and Van Heerden et al. U.S. Pat. No. 7,143,568 describe the use of the use of energy-releasing RCM for local joining (e.g., bonding, welding, soldering or brazing) of two bodies or objects. All of the aforementioned patents and patent application are incorporated by reference in their entireties herein.

Consideration is now being given to incorporating RCM in the design and fabrication of articles, which have porous or foam-like structural elements. The porous or foam-like structural elements may provide suitable physical properties (e.g., mechanical, acoustic, and/or optical properties) to the articles.

SUMMARY

In one aspect, articles that include porous or foam-like structures or elements are provided. The porous or foam-like structures or elements include voids, which are formed utilizing fluids generated, directly or indirectly, by reacting reactive composite materials (RCM).

A method for making, for example, an article that includes porous or foam-like structures or elements includes providing (RCM) in or proximate to a region. The RCM are configured to generate fluids upon reaction. The method further includes generating fluids by selectively reacting a portion of the RCM, and forming a selected arrangement of voids that are filled with the generated fluids A customizable article blank includes a selected pattern of RCM elements disposed in or proximate to a region. The RCM are configured to generate fluids upon reaction and form fluid-filled voids in the region (e.g., in the RCM itself or adjoining host materials). For example, gases generated by reacting the RCM may be used to foam a liquid (e.g. metal) as it cools to create metal foam. The selected pattern of RCM elements may correspond to one or more user-selectable arrangements of voids.

An article (e.g., a foam structure) includes a host material disposed in a region defining the foam structure, and a selected arrangement of voids in the host material corresponding to a reacted portion of a pattern of fluid-generating RCM disposed in or proximate to the host material.

The foregoing summary is illustrative only and is not intended to be limiting. In addition to the illustrative aspects, embodiments, and features described above, further aspects, embodiments, and features of the solutions will become apparent by reference to the drawings and the following detailed description.

BRIEF DESCRIPTION OF THE FIGURES

In the accompanying drawings:

FIG. 3 is a schematic illustration of the blank of FIG. 1 in which selected portions of the RCM are reacted to make porous or foam-like elements, in accordance with the principles of the solutions described herein;

FIG. 4 is a schematic illustration of an article having customizable microplumbing elements, in accordance with the principles of the solutions described herein; and FIGS. 5 and 6 are schematic illustrations of exemplary methods using RCM for making articles having porous or foam-like elements, in accordance with the principles of the solutions described herein.

Throughout the figures, unless otherwise stated, the same reference numerals and characters are used to denote like features, elements, components, or portions of the illustrated embodiments.

DESCRIPTION

Figure 1:
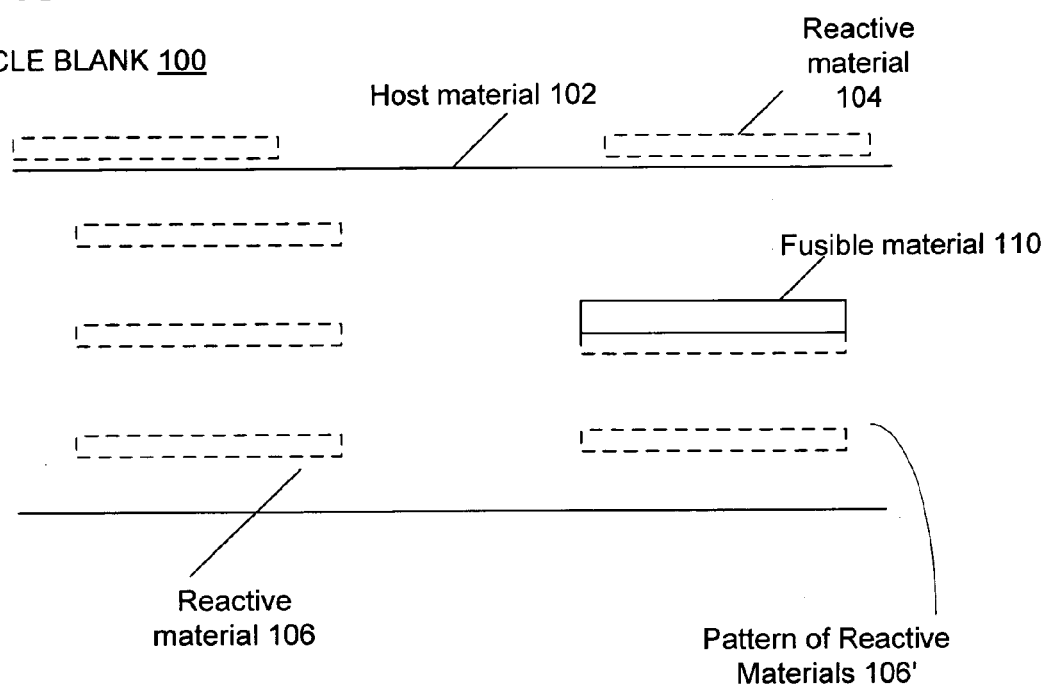
FIG. 1 is a schematic illustration of an exemplary article blank including reactive composite materials (RCM) arranged in a selected pattern, in accordance with the principles of the solutions described herein.

In the following description of exemplary embodiments, reference is made to the accompanying drawings, which form a part hereof. It will be understood that embodiments described herein are exemplary, but are not meant to be limiting. Further, it will be appreciated that the solutions described herein can be practiced or implemented by other than the described embodiments. Modified embodiments or alternate embodiments may be utilized, in the sprit and scope of the solutions described herein.

Articles that include porous or foam-like elements are provided. The design, fabrication and structures of these articles exploit properties of reactive composite materials (RCM) and their reaction products. The RCM may react to directly produce fluids (e.g., gases, liquids, and/or fluidized particles) that lead to the formation of voids making the porous or foam-like elements. Additionally or alternatively, the RCM may react to heat or otherwise alter adjoining material to produce fluids leading to the formation of voids making the porous or foam-like elements.

FIGS. 1-4 show exemplary article blanks and articles (100-400) that include RCM and/or RCM reaction products in or proximate to regions defining the articles. The RCM may include reactive powdered materials (e.g., powder compacts or mixtures) disposed in binders (e.g., epoxy). Other exemplary RCM may include mechanically-shaped combinations of reactive materials including, for example, one or more of reactive metals, metal oxides, Ba, carbon and its compounds, Ca, Ce, Cr, Co, Fe, Hf, Mg, Mn, Mo, Nb, Ni, Si, Ta, Ti, Th, V, W, and Zr. Mo, Cu, Ti, Zr, Hf, V, Nb, Ta, Ni, Pd, Rh, Ni, Zr, B, C, Si, Al, $Fe_2O_3$, $Cu_2O$, $MoO_3$, FeCo, $FeCoO_x$, a carbide, a nitride, monel, an alloy, a metallic glass, or a metal ceramic.

The RCM assembled or incorporated in the article blanks and articles may have any suitable form (e.g., multilayers, islands, particles, nanofoils etc.). Further, any suitable fabrication method may be used to assemble or fabricate the RCM. The suitable method may include mechanical shaping (e.g., milling, machining, swaging, rolling, pressing, etc.) and/or physical and chemical deposition and etching (e.g., chemical vapor deposition, sputter deposition, etc.) Likewise, any suitable fabrication technique may be used to assemble or incorporate RCM in a component (e.g., in a host material of the component).

The type and shape of RCM incorporated in an article blanks or article may be suitably selected, for example, in consideration of the contribution of the material properties of the RCM (and its products) to the article's properties or functions behavior, the reactive properties of the RCM (e.g., heats of reaction, reaction self-propagation velocity, etc.), and/or the nature and form of the RCM's reaction products (e.g., phase and wetting characteristics of the reaction products). See e.g., M. E. Reiss, C. M. Esber, D. Van Heerden, A. J. Gavens, M. E. Williams, and T. P. Weihs, "Self-propagating formation reactions in Nb/Si multilayers," Mater. Sci. Eng., A 261, 217 (1999), which is incorporated by reference in its entirety herein. The cited reference describes self-propagating formation reactions in Nb/Si multilayers and demonstrates that their reaction velocities decrease as the individual Nb and Si layers thicken.

Further, the type and shape of RCM incorporated in the incorporated in a component may be selected in consideration of the suitability of applicable reaction initiation methods (e.g., ignition by electrical spark, pressure, electromagnetic pulses etc.).

FIG. 1 shows an exemplary customizable article blank 100, which includes a host material 102 in a region defining the blank. The host material may be any suitable material (e.g., metal, glass, polymer, ceramic, etc.) selected with consideration of the article properties and functionalities. One or more RCM elements (104 and 106) are disposed in or proximate to the region defining the article blank. Further, the RCM elements may be disposed proximate to other article elements, for example, element 110 that is made of fusible or vaporizable material.

The RCM elements are disposed in a pattern 106' corresponding to one or more selectable article configurations that can be obtained by selectively reacting the RCM elements. At least one of the selectable article configurations may include porous and/or foam-like elements formed as a result of the reactions. The porous and/or foam-like elements may occupy the same space as the reacted RCM elements, space adjoining the reacted RCM elements (e.g., in host material 102, fusible material 110, etc.), or any combination of the spaces. The porous and/or foam-like elements may lend particular structural characteristics (e.g., strength, density, permeability, etc.) or other properties (e.g., optical, acoustic, thermal, etc.) to the article.

With reference to FIG. 1, a 2-dimensional pattern 106' of RCM elements 106, which have rectangular cross sectional shapes, is disposed in host material 102 of an exemplary article blank 100. It will be understood that 2-dimensional pattern 106' shown in FIG. 1 is only exemplary. In general, RCM pattern 106' may have any suitable dimensions (e.g. 1-D, 2-D or 3D). Further, it will be understood that RCM elements 106 may have any suitable shape based, for example, on article design and customization considerations. For example, RCM element 106 may be a Ni/Si RCM nanofoil that has an increasing thickness along an axis with a view to have correspondingly decreasing reaction velocities along the axis. In general, RCM elements 106 may have any one or more dimensional, simple or complex shapes. Likewise, RCM elements 106 may have any suitable form. One or more RCM elements 106 may, for example, be in the form of layers, reactive nanofoils, islands, and/or particles disposed in the region defining the article.

Article blank 100 may be configured so that a reaction can be started or initiated in selected portions of RCM pattern 106' (and/or proximate RCM elements 104) by any suitable technique (e.g., a spark or ignition pulse, an applied energy pulse, an optical energy pulse, applied pressure, etc.). A reaction that is started or initiated in a portion of RCM pattern 106' and/or RCM elements 104 may sustain itself by self-propagate to other portions of RCM pattern 106 in a controlled manner according to the structure and composition of the RCM.

Figure 2:
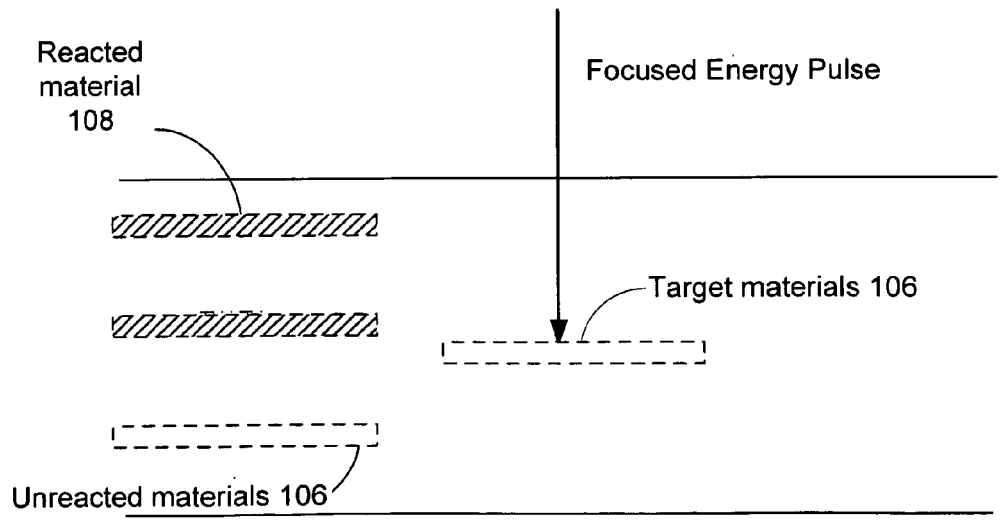
FIG. 2 is a schematic illustration of an exemplary method for fabricating an article having foam-like structures by selectively reacting the RCM in the article blank of FIG. 1, in accordance with the principles of the solutions described herein.

A reaction in a RCM element 106 may be initiated, for example, by selectively applying energy pulses, sparks, or pressure to blank 100. FIG. 2 shows, for example, an energy pulse focused to a selected depth to initiate a reaction in a target RCM element 106. FIG. 2 also schematically shows reacted material 108 resulting from reaction of target RCM elements 106. It will be understood that reacted material 108 as shown schematically in FIG. 2 represents material and/or structural changes in both RCM and host material.

The reaction may result in changes in the composition of blank 100. For example, a dielectric constituent may change into a metal, a metal may change into a dielectric material, and/or one dielectric constituent may change into another dielectric material upon reaction. Further, the reaction may result in changes in the structure of blank 100 due to, for example, differences in volumes of pre- and post-reacted RCM, and/or heat absorbed or generated in the reaction.

The changes in composition and structure of blank 100 upon reaction may be in the RCM constituents and/or the host material constituents. For example, the RCM reaction may generate exothermic heat (or absorb endothermic heat) to modify properties (e.g., dielectric properties) of host material portions adjoining the RCM. Further, for example, the RCM reaction may result in diffusion, mixing and/or chemical reaction of material species between the RCM and host material 102.

In general, article blank 100 and other like blanks for making articles having porous or foam-like structures include a selected pattern of RCM disposed in or proximate to a region. The RCM may be configured to generate fluids upon reaction and to form fluid-filled voids in the region. The fluids may be generated directly—in the reacting RCM material, and/or indirectly—in adjoining fluid-generating material. Likewise, fluid-filled voids may be formed in the RCM material, and/or in adjoining fluid-generating material. The adjoining material may be liquefied or vaporized by heat from the reacting RCM. The fluids may be removable from the fluid-filled voids.

The selected pattern of RCM in the blanks may correspond to one or more user-selectable arrangements of voids. Exemplary arrangements of voids may, for example, include a periodic arrangement, a select spatial distribution, and/or a select size distribution of voids. The distribution of voids may correspond to selected optical, acoustic, and/or porosity property or attribute of the region defining the article. These properties or attributes may be properties of attributes of voids filled with fluids generated directly or indirectly by RCM reactions, voids filled with another material, and/or emptied voids.

A selected optical property of the region may, for example, be one or more of a photonic crystal, a polarization, a scattering, a refractive, a reflective, a diffractive, an absorptive, and/or a metamaterial property. A selected acoustic property of the region may, for example, be one or more of a sound speed, an elastic, a scattering, a refractive, a reflective, a polarization, a diffractive, and/or an inertial property. A selected porosity attribute of the region may, for example, be one or more of pore size, pore volume fraction, or pore interconnectivity. The selected porosity attribute of the region may, for example, correspond to one or more of a selected flow conductivity, thermal conductivity, permittivity, structural strength, sound speed, and/or acoustic scattering property of the region or any combination of such properties.

One or more optical properties of the region defining article blank 100 may be responsive to a reaction of the RCM therein. The optical properties that are affected or depend upon a state of the RCM (e.g., reacted or unreacted) include, for example, a permittivity, an index of refraction, an absorption coefficient, a spectral property, a transmission property, or an optical confinement property of the region. The property may be an RF, MW, THz, IR, visible, and/or UV property. Likewise, one or more mechanical or structural properties (e.g., shape, size, elasticity, volume, density, and/or crystallinity) of article blank 100 may be responsive to a reaction of the RCM therein.

An article formed by customizing article blank 100 by selective reacting RCM elements in the blank may have one or more particular mechanical or structural properties (e.g., shape, size, elasticity, volume, density, porosity, and/or crystallinity).

An article (e.g., a foam structure) made by reacting RCM elements in an article blank may include a selected arrangement of voids in the host material corresponding to a reacted portion of a pattern of fluid-generating reactive composite materials (RCM) disposed in or proximate to the host material. The article may include both reacted and unreacted RCM disposed in or proximate to the region that defines the foam structure. The reaction product material may include the generated fluids and/or residues thereof. The voids in the article may be filled with the reaction product material (e.g., generated fluids) and/or other with other material (e.g., replacement fluids). Alternatively, the voids may be emptied (e.g., by draining or absorbing the fluids therein).

FIGS. 3 and 4 show exemplary articles that may be obtained by selectively reacting RCM elements in article blank 100. FIG. 3 shows, for example, an article 300 having porous of foam-like structural elements 301-304, which are formed selectively reacting RCM elements in article blank 100. Element 301, for example, includes voids formed in host material 102 and also voids formed in the reacted precursor RCM element. The voids in host material 102 may be formed, for example, by gas bubbles or fluid droplets trapped in adjacent host material which is liquefied by heat from reacting precursor RCM element. Further, as shown for example in FIG. 3, elements 302, 303, and 304 of article 300 may respectively include voids formed in host material 102, in adjoining fusible material 110, and in the precursor RCM element itself.

FIG. 4 shows an article 400 with microplumbing elements (e.g., 412 and 414), which may be customized by selectively reacting selectively reacting portions of RCM 106 disposed in an article blank. Article 400, for example, includes "open" flow-conductive mircochannels 412 and "closed" flow-blocking microchannels 414. Open and closed mircochannels 412 and 414 may correspond to selectively reacted and unreacted RCM elements 106, respectively. Open microchannels 412 may, for example, correspond to interconnected voids created by reacting RCN elements. The fluids that are generated by the reacting RCM and fill the interconnected voids may be absorbed internally or discharged externally to create open or flow conductive microchannels 412. Conversely, in other versions of article 400, open and closed mircochannels 412 and 414 may correspond to unreacted and selectively reacted RCM elements 106, respectively. In these versions of article 400, fluids and/or other reaction products generated by reacting RCM elements 106 may block pre-existing open channels or voids in an article blank to create closed mircochannels 414.

It will be understood that blank 100 may also include pre-formed devices or devices structures (not shown) that are in addition to RCM elements 106. These preformed devices and device structures may be independent of devices structures formed by reacting RCM elements 106. Additionally or alternatively, the preformed devices and device structures may be modified by selectively reacting RCM elements 106. For example, pre-existing open channels or pores in blank 100 may be filled or blocked by selectively reacting RCM elements One or more optical properties of an article formed by customizing blank 100 by selectively reacting RCM therein are a function of the reaction product material left in the component. An optical property may, for example, be a permittivity, a polarization, an index of refraction, an absorption coefficient, a conductivity, a magnetic susceptibility, a spectral property, a transmission property, or a reflection property of the region defining the component. The optical property may be a RF, MW, THz, IR, visible, and/or UV property. Further, mechanical and or structural properties (e.g., shape, elasticity, size, density, crystallinity, etc.) of the article are a function of the reaction product material left in the component.

Methods for making articles having porous or foam-like structures may involve RCM materials. FIGS. 5 and 6 show exemplary methods 500 and 600 for making such articles.

With reference to FIG. 5, method 500 includes generating fluids (e.g., gases and/or liquids) by reacting RCM disposed in a selected pattern in a host material (510), and forming fluid-filled voids in the host material (520). Method 500 may include liquefying and/or vaporizing the RCM and/or a portion of a solid host material using heat from the reacting RCM.

The selected RCM pattern may correspond to one or more user-selectable arrangements of the fluid-filled voids. The fluids may be generated in the RCM itself and/or in a fluid-generating material disposed proximate to the RCM. Likewise, the fluid-filled voids may be formed in the RCM itself and/or in material proximate to the RCM.

The voids may be created so that they are interconnected. Further, the RCM-generated fluids in the voids may be removed (e.g., by absorption in the host material, changing phase, reacting, and/or draining). The fluids may be drained, for example, by one or more of pumping, capillary flow, displacement, and/or gravity flow. Method 500 may include replacing or reacting the fluids in the voids with another fluid. Further, method 500 may include adding another fluid to the voids. With reference to FIG. 6, method 600 includes providing RCM in or proximate to a region (610), for example, in a pattern corresponding to one or more selectable arrangements of voids. The RCM are configured to generate fluids upon reaction. Method 600 further includes generating fluids by selectively reacting a portion of the RCM in or proximate to the region (620), and forming a selected arrangement of voids that are filled with the generated fluids in or proximate to the region (630).

The selected arrangement of voids may, for example, include a selected spatial and/or size distribution of voids (e.g., a periodic arrangement of voids). The selected distribution of voids may correspond to particular optical, acoustic, porosity or other properties of the region.

While various aspects and embodiments have been disclosed herein, other aspects and embodiments will be apparent to those skilled in the art. It will be understood that the various aspects and embodiments disclosed herein are for purposes of illustration and are not intended to be limiting, with the true scope and spirit being indicated by the following claims.

The invention claimed is:

1. A method, comprising:
generating fluids by reacting reactive composite materials (RCM) disposed in a selected pattern in a host material; and
forming fluid-filled voids in the host material; wherein generating fluids by reacting RCM comprises reacting reactive metals and/or metal oxides.

2. The method of claim 1, wherein the selected RCM pattern corresponds to one or more selectable arrangements of the fluid-filled voids.

3. The method of claim 1, wherein generating fluids by reacting RCM comprises reacting at least one of Ba, carbon and its compounds, Ca, Ce, Cr, Co, Fe, Hf, Mg, Mn, Mo, Nb, Ni, Si, Ta, Ti, Th, V, W, Zr, Cu, Pd, Rh, B, Al, $Fe_2O_3$, $Cu_2O$, $MoO_3$, FeCo, $FeCoO_x$, a carbide, a nitride, monel, an alloy, a metallic glass, or a metal ceramic.

4. The method of claim 1, wherein generating fluids comprises generating gases and/or liquids.

5. The method of claim 1, wherein generating fluids comprises generating gases and/or liquids in the RCM disposed in the selected pattern in the host material.

6. The method of claim 1, wherein generating fluids comprises heating a fluid-generating material disposed proximate to the RCM disposed in the selected pattern in the host material.

7. The method of claim 1, wherein forming fluid-filled voids in the host material comprises forming fluid-filled voids in the RCM disposed in the selected pattern in the host material.

8. The method of claim 1, wherein forming fluid-filled voids in the host material comprises forming fluid-filled voids in material proximate to the RCM disposed in the selected pattern in the host material.

9. The method of claim 1, wherein the host material is a solid material, the method further comprising liquefying a portion of the host material using heat from the reacting RCM.

10. The method of claim 1, wherein forming fluid-filled voids in the host material comprises forming interconnected voids.

11. The method of claim 1, wherein forming fluid-filled voids in the host material comprises forming the voids in an arrangement corresponding to the selected pattern of the RCM in the host material.

12. The method of claim 1, wherein forming fluid-filled voids in the host material comprises reacting a first fluid with a second fluid.

13. The method of claim 1, further comprising, removing fluid from the fluid-filled voids to form foam-like structures in the host material.

14. The method of claim 13, wherein removing fluid from the fluid-filled voids comprises at least one of absorbing the fluid in the host material, changing phase, reacting, and/or draining the fluid.

15. The method of claim 14, wherein draining the fluid from the fluid-filled voids comprises draining the fluid by one or more of pumping, capillary flow, displacement, and/or gravity flow.

16. The method of claim 1, further comprising, adding another fluid to the voids.

17. A method, comprising:
providing reactive composite materials (RCM) in or proximate to a region, wherein the RCM are configured to generate fluids upon reaction;
generating fluids by selectively reacting a portion of the RCM in or proximate to the region; and forming a selected arrangement of voids that are filled with the generated fluids in or proximate to the region; wherein providing the RCM comprises providing reactive metals and/or metal oxides.

18. The method of claim 17, wherein providing RCM comprises providing RCM in a pattern corresponding to one or more selectable arrangements of voids.

19. The method of claim 17, wherein forming a selected arrangement of voids comprises forming a periodic arrangement of voids.

20. The method of claim 17, wherein forming a selected arrangement of voids comprises forming a selected spatial and/or size distribution of voids.

21. The method of claim 17, wherein forming a selected arrangement of voids comprises forming a distribution of voids corresponding to a selected optical property of the region.

22. The method of claim 21, wherein the selected optical property of the region is one or more of a photonic crystal, a polarization, a scattering, a refractive, a reflective, a diffractive, an absorptive, and/or a metamaterial property.

23. The method of claim 21, wherein the selected optical property of the region is a property of voids filled with the generated fluid, voids filled with another material, and/or emptied voids.

24. The method of claim 17, wherein forming a selected arrangement of voids comprises forming a distribution of voids corresponding to a selected acoustic property of the region.

25. The method of claim 24, wherein the selected acoustic property of the region is one or more of a sound speed, an elastic, a scattering, a refractive, a reflective, a polarization, a diffractive, and/or an inertial property.

26. The method of claim 24, wherein the selected acoustic property of the region is a property of voids filled with the generated fluid, voids filled with another material, and/or emptied voids.

27. The method of claim 17, wherein forming a selected arrangement of voids comprises forming a distribution of voids corresponding to a selected porosity attribute of the region.

28. The method of claim 27, wherein the selected porosity attribute of the region is one or more of pore size, pore volume fraction, or pore interconnectivity.

29. The method of claim 27, wherein the selected porosity attribute of the region corresponds to one or more of a selected thermal conductivity, permittivity, structural strength, sound speed, and/or acoustic scattering property of the region.

30. The method of claim 27, wherein the selected porosity attribute of the region is a property of voids filled with the generated fluid, voids filled with another material, and/or emptied voids.

31. The method of claim 17, wherein providing the RCM comprises providing at least one of carbon and its compounds, Ca, Ce, Cr, Co, Fe, Hf, Mg, Mn, Mo, Nb, Ni, Si, Ta, Ti, Th, V, W, Zr Cu, Pd, Rh, B, Al, $Fe_2O_3$, $Cu_2O$, $MoO_3$, FeCo, $FeCoO_x$, a carbide, a nitride, monel, an alloy, a metallic glass, or a metal ceramic.

32. The method of claim 17, wherein generating fluids comprises generating gases and/or liquids.

33. The method of claim 17, wherein generating fluids comprises generating gases and/or liquids in the RCM and/or heating a fluid-generating material disposed proximate to the RCM.

34. The method of claim 17, wherein forming a selected arrangement of fluid-filled voids in the region comprises forming fluid-filled voids in the RCM.

35. The method of claim 17, wherein forming a selected arrangement of fluid-filled voids in the region comprises forming fluid-filled voids in material proximate to the RCM.

36. The method of claim 35, wherein the material proximate to the RCM is liquefied using heat from the reacting RCM.

37. The method of claim 17, further comprising, removing fluid from the fluid-filled voids.

* * * * *